July 2, 1946.　　　　G. A. MORRELL　　　　2,403,294
FRUIT PICKER

Filed Feb. 12, 1944

INVENTOR.
Glenn A. Morrell
BY
atty.

Patented July 2, 1946

2,403,294

UNITED STATES PATENT OFFICE 2,403,294

FRUIT PICKER

Glenn A. Morrell, Seattle, Wash.

Application February 12, 1944, Serial No. 522,172

4 Claims. (Cl. 56—331)

This invention relates to fruit-pickers, and particularly to a hand implement combining means for cutting with means for gathering, and which, while perhaps finding its greatest utility in the picking of cherries, lends itself to the picking of substantially any type of fruit.

The invention, as one object, aims to devise a simple and efficient picking implement of comparatively large gathering capacity which admits of being readily manipulated by the use of one hand only, by such token leaving the other hand of the operator entirely free to draw the fruit-carrying branches into positions of ready accessibility. It is a further object of the invention to provide a device which will give an operator a relatively large working radius and in consequence increase the picking speed by cutting down time losses incident to frequent moves by pickers from one to another spot. This extension of effective reach has the further and important advantage of introducing a safety factor by enabling pickers who are "working" a tree to pick the same relatively clean without the necessity of moving to outlying and less secure branches. As a further object still, the invention aims to provide a fruit-picker which will largely eliminate damage to the trees caused by breaking of small limbs, of frequent occurrence where the fruit is hand-pulled from the tree. Especially pronounced in the instance of cherries, the present picking implement, further, obviates the molding which represents a considerable loss in the crop yield and which—in hand picking—occurs as the result of separating the cherry from its stem.

The foregoing, with still further objects and advantages, will appear and be understood in the course of the following description and claims, the invention consisting in the novel construction and in the adaptation and combination of parts hereinafter described and claimed.

Figure 1:
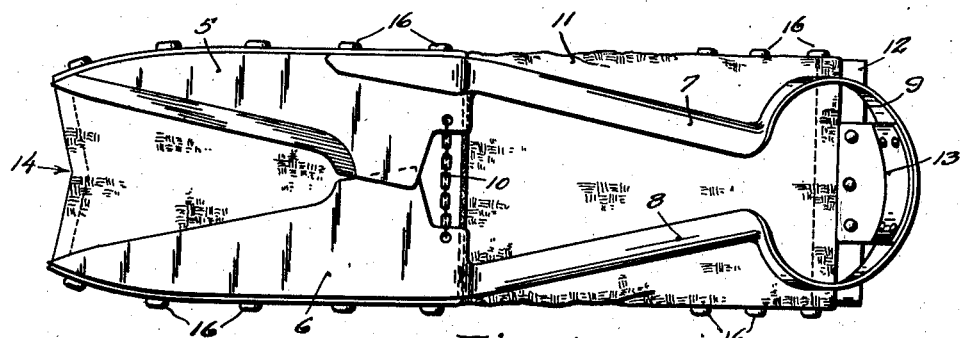
Figure 2:
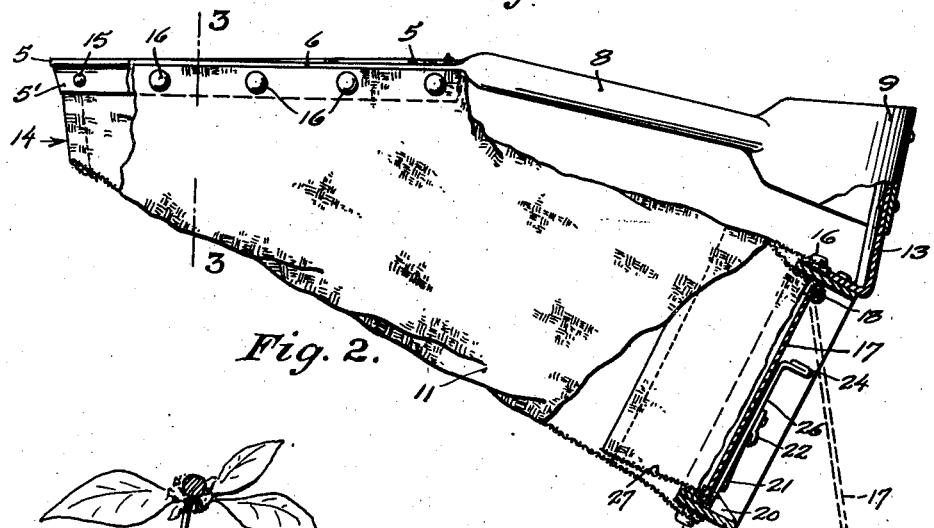
Figure 3:
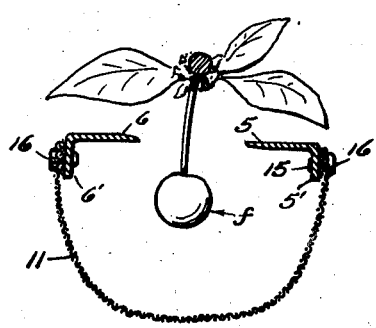
Figure 4:
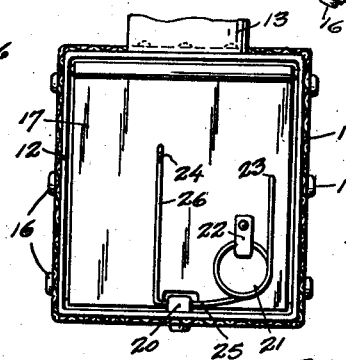

A preferred embodiment of the invention is illustrated in the accompanying drawing, wherein:

Figure 1 is a top plan view; Fig. 2 is a view principally in side elevation with parts broken away and shown in longitudinal vertical section; Fig. 3 is a transverse vertical section on line 3—3 of Fig. 2 and embodying the disclosure of a cherry to indicate the position in which the same is placed preparatory to picking; and Fig. 4 is a fragmentary rear end elevation detailing the latch structure which I have elected to show as a suitable means for releasably securing the gate through which gathered fruit, following a filling of the receiving sack, is discharged into a bucket or other like container hung at a point convenient to the picker.

According to the present invention, there is provided an ordinary pair of gardening shears which are or may be of the grass-cutting type illustrated, namely a pair of shears constituted of blades 5 and 6 extending as fixed prolongations of arm elements 7—8 by which the tool is gripped and the blades contracted against the spring opposition of an integral backing loop 9. I have shown a chain-stop 10 to prevent jumping of the blades, a customary expedient for the purpose.

The gathering sack of my device I have illustrated as consisting of a sleeve 11 of canvas or other suitable flexible material, thus open at both ends, and the mouth which lies at one end of this sleeve has its side margins attached to the outer edges of the two blades, the front and back margins being unattached, and the other said mouth is fitted over and attached to a ring 12 which is suspended by a bracket 13 to occupy a position subjacent to the spring loop 9. The cut given to the blade-attached end of the sleeve is on the bias to enable the sleeve to locate its major axis diagonal to the general plane of the shears and sloping rearwardly therefrom, and said admission mouth has its frontal portion cut away, as at 14, to permit the picking operation to be performed by moving the instrument in a horizontal direction into the stem-cutting position of Figure 3, in other words introducing the stem-suspended fruit, as f, through the front opening rather than accomplishing the insertion of the fruit by the act of bringing the instrument upwardly from a position below the fruit. Upon cutting the stem, the severed fruit perforce drops into the sack. The attachment of the sack to both the blades and the ring is or should be such as to permit ready removal for purposes of cleaning, ordinary snap-buttons consisting of the studs 15 and mating socket pieces 16 being suitable. As best seen from an inspection of Fig. 3, I have departed somewhat from the usual design of grass-shears by forming the blades with depending flanges, as 5' and 6', to which the stud elements are affixed. While shown integral, the flanges could be soldered to customary flat blades, and might, of course, be deleted and the sack attached directly to the outer edge of the blade proper.

Reverting to the ring 12 and which constitutes the discharge opening from the sack, there is received therein a gate 17 to serve as a closure therefor, the gate being hinged from a pin 18 and being normally held in a closed position by the interaction of a catch, as the ring-carried lug 20, and latch structure carried upon the exposed face of the gate. This latch is shown as being comprised of a length of spring wire including a median loop 21 caught under a clip 22, one end 23 of the wire being anchored to the gate and the other end being produced to an L-form terminaitng in an upstanding finger 24. One leg 25 of this L, or which is to say the leg which lies proximal to the loop, is placed such as to lodge behind the catch 20, and the other leg 26 runs upwardly therefrom and positions its terminal finger in the approximate center of the gate. The resulting exposure of the operating finger, considered as to its being removed inwardly from the surrounding walls of the encompassing ring, permits the gate to be readily unlatched by the simple expedient of brushing the said finger against any projection which may, very readily, be applied upon the rim of the bucket or other container into which the contents of the gathering sack are to be discharged, being relatively proof, however, against accidental opening from the fact of the finger being given a projection in point of height less than that of the walls of the ring.

As a liner for preventing the fruit, as it is gathered and dropped into the sack, from coming into contact with the inner rim of the ring and becoming bruised thereby, I apply a protective skirt, as indicated at 27, which is stitched to the canvas of the sack.

The manner of using the described picker should be clear from the foregoing. While it is thought to be apparent that a number of modifications are well within the spirit of the teachings, it should, perhaps, be pointed out that the rear gate is not an essential feature. While a picker without this feature would be less desirable, it is entirely feasible to use a sack permanently closed at its lower end and, for discharging the contents, pour the same from the frontal opening 14. A means should, in such an embodiment, be employed to support the rear end of the sack from the heel part of the shears, not only from the fact that the operator would be otherwise required to use his other hand in holding the rear end elevated above the pouring opening, but also to obviate a bruising of the contents during picking usage, as a sack—swinging free—would be frequently caused to strike against limbs as the shears are manipulated over and around the branches of a tree, the present illustrated arrangement protecting thereagainst by the tapering design and the holding of the sack and the shears in relatively close compass.

What I claim is:

1. A fruit-picking implement comprising the combination of hand-shears providing paired relatively movable shearing blades, and having handgrips integral with the blades for actuating the latter in their shearing office; and a fruit-gathering sack, having an open top and a normally closed bottom, attached by its said open top directly to the outer edges of the blades, the frontal part of the sack and namely that part which extends across the blades from the tip of one to the tip of the other blade being cut away to produce a re-entrant mouth when viewed in front elevation, said re-entrant cut serving as an admission opening to enable fruit while still suspended by the stem to enter the sack in course of bringing the blades, by horizontal movement, into positions at opposite sides of the supporting stem.

2. The implement of claim 1 in which the sack is supported to have its bottom wall, or which is to say its under side, inclined downwardly and rearwardly at a moderate angle from the general plane of the shears, and being of a length such that its bottom end extends to approximately the rear limit of the shears.

3. The fruit-picking implement of claim 1 in which the sack is produced from a sleeve of flexible material having a stiffening ring fitting the open bottom; and an outwardly swinging hinged gate received within and supported by said ring and serving as a removable closure permitting the gathered fruit to be discharged from the sack.

4. A fruit-picking implement comprising the combination of hand-shears providing paired relatively movable shearing blades, and having hand grips functionally associated with the blades for actuating the latter in their shearing office; and a fruit-gathering sack, having an open top and a normally closed bottom, attached by its said open top directly to the outer edges of the blades, the frontal part of the sack and namely that part which extends across the blades from the tip of one to the tip of the other blade being cut away to produce a re-entrant mouth when viewed in front elevation, said re-entrant cut serving as an admission opening to enable fruit while still suspended by the stem to enter the sack in course of bringing the blades, by horizontal movement, into positions at opposite sides of the supporting stem.

GLENN A. MORRELL.